Jan. 2, 1968   R. FLATT   3,361,522
PROCESS FOR THE PREPARATION OF POTASSIUM NITRATE
Filed March 24, 1964   2 Sheets-Sheet 1

United States Patent Office 3,361,522
Patented Jan. 2, 1968

3,361,522
PROCESS FOR THE PREPARATION OF POTASSIUM NITRATE
Robert Flatt, deceased, late of Lausanne, Switzerland, by Alice Flatt, nee Madory, and Jean-Pierre Flatt, Lausanne, and Rene-Alexandre Flatt, Winterthur, Switzerland, as heirs, assignors to Lonza Ltd., Gampel, Valais, Switzerland
Filed Mar. 24, 1964, Ser. No. 354,470
Claims priority, application Switzerland, Mar. 28, 1963, 3,942/63
3 Claims. (Cl. 23—102)

ABSTRACT OF THE DISCLOSURE

In the preparation of potassium nitrate from a starting solution containing calcium nitrate and potassium chloride, potassium nitrate is precipitated at a temperature of −10 to −20° C.; the remaining mother liquor is concentrated and a double salt $KNO_3 \cdot CaCl_2 \cdot 2H_2O$ is precipitated at a temperature of 20 to 25° C., which is added to a fresh starting solution. The remaining mother liquor is also recycled after removal of precipitated calcium chloride.

---

This invention relates to the preparation of potassium nitrate from calcium nitrate and potassium chloride.

It is known that $KNO_3$ can be precipitated from aqueous solution of $Ca(NO_3)_2$ and $KCl$. As the solubility of $KNO_3$ strongly increases with increasing temperature, the $KNO_3$ crystallization is carried out at lower temperatures. If $Ca(NO_3)_2$ and $KCl$ are employed in a molar ratio of 1:2, a maximum $KNO_3$ yield of only 76 percent is obtained at a temperature as low as −20° C. In addition to $CaCl_2$, the remaining mother liquor contains still the ions $K^+$ and $NO_3^-$ in considerable amounts.

It is also known to increase said yield of crystalline $KNO_3$ by carrying out the reaction in the presence of ammonia. But also in such modification, the amount of $KNO_3$ remaining in the mother liquor is still quite considerable, so that also this method is commercially unsatisfactory.

A principal object of this invention is to provide a process increasing the yield of potassium nitrate in the reaction of potassium chloride with calcium nitrate.

Other objects and advantages will be apparent from a consideration of the specification and claims.

It was found that in solutions which contain $Ca(NO_3)_2$ in addition to $CaCl_2$ and $KNO_3$, formation of the double salt $KNO_3 \cdot CaCl_2 \cdot 2H_2O$ can take place at normal temperature. Said double salt has incongruent solubility. On addition of water, it decomposes with precipitation of $KNO_3$. It was further found that, at a temperature of about 25° C., the solubility range of the double salt in the solubility diagram of the reciprocal salt pair $$Ca(NO_3)_2 + 2KCl \rightleftharpoons 2KNO_3 + CaCl_2$$

extends close to the border zone $$Ca^{++}\text{---}Cl^-\text{---}NO_3^-\text{---}H_2O$$

Finally, it was found that at low temperatures, e.g. below 0° C., the salt is no longer within its saturation range, and that solutions, which at normal temperature saturated with the double salt $KNO_3 \cdot CaCl_2 \cdot 2H_2O$, precipitate on cooling calcium chloride in the form of $CaCl_2 \cdot 6H_2O$.

Figure 1:
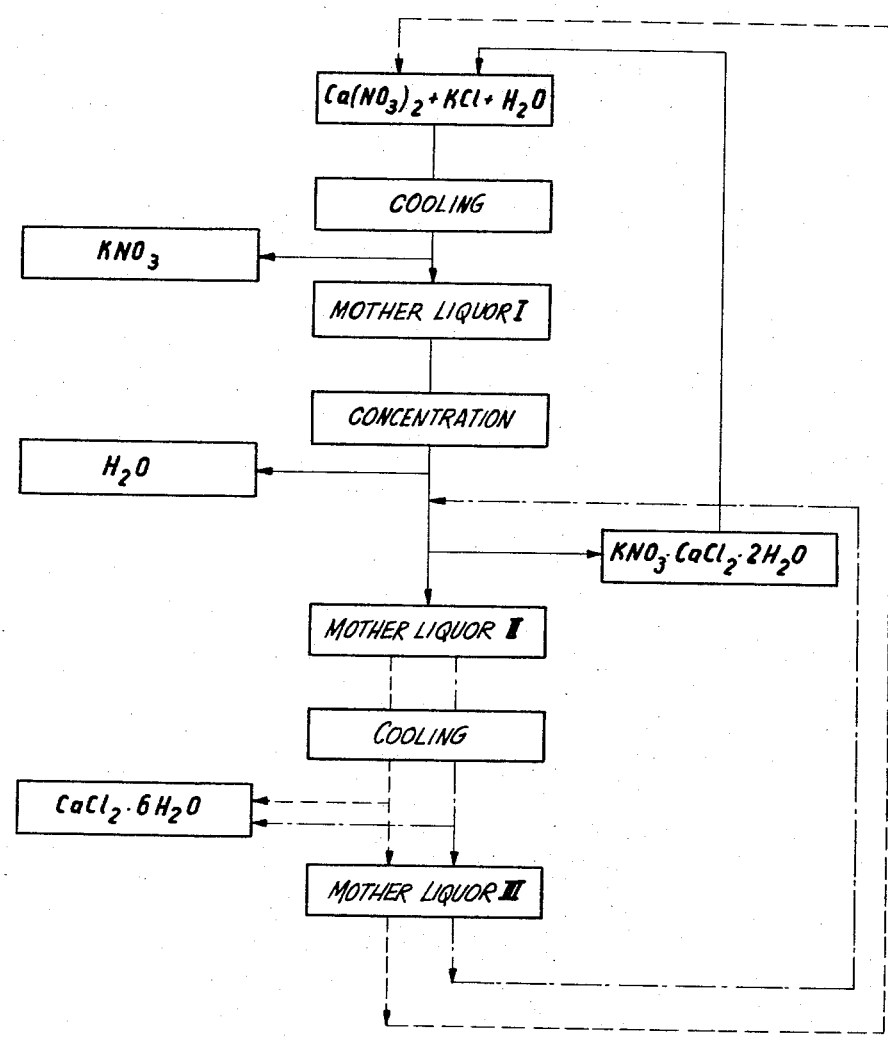
Figure 2:
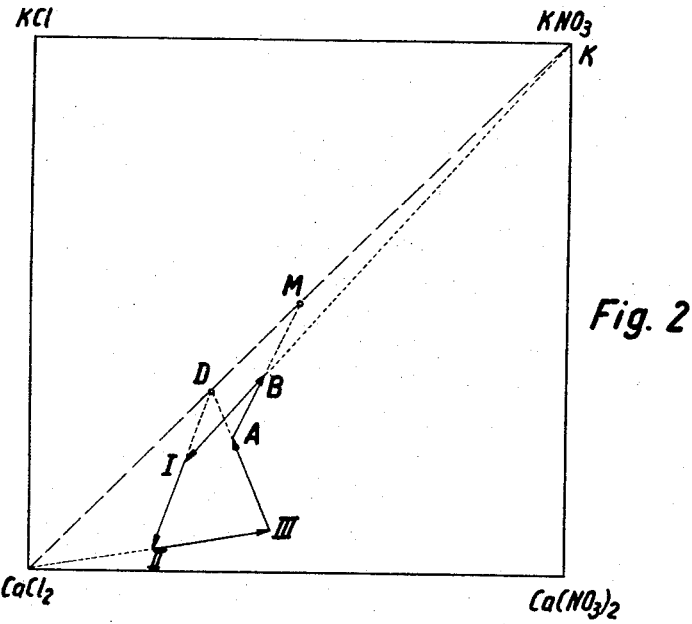
Figure 3:
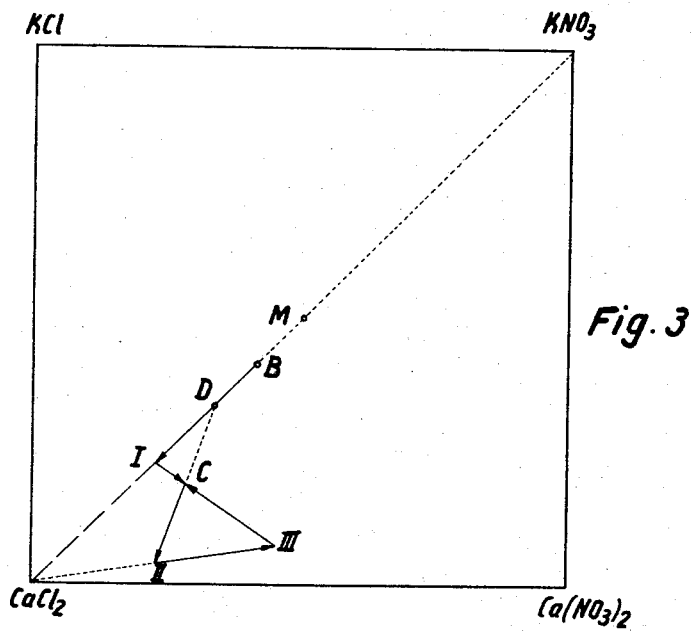

In the accompanying drawings,
FIG. 1 is a flow sheet showing schematically the process of the invention, and
FIGS. 2 and 3 show two embodiments of the invention with reference to the solubility diagrams of the reciprocal salt pairs involved.

The process of the invention for the preparation of potassium nitrate from calcium nitrate and potassium chloride comprises essentially the following steps: In a first step, potassium nitrate is precipitated by cooling a solution of calcium nitrate and potassium chloride; in the second step, the mother liquor I remaining after removal of the precipitated potassium chloride is concentrated and cooled to precipitate the double salt $$KNO_3 \cdot CaCl_2 \cdot 2H_2O$$

said double salt is separated from the mother liquor and recycled into the first step of the process.

In a preferred embodiment of the invention, $KNO_3$ is precipitated in the first step of the process by cooling below room temperature, preferably at −10 to −20° C.

The mother liquor I is suitably concentrated to 40 to 65, preferably to 45 to 60 percent of its initial weight. On cooling to room temperature, i.e. to about 20–25° C., the double salt $KNO_3 \cdot CaCl_2 \cdot 2H_2O$ crystallizes out in high yield. Said double salt is introduced into the starting solution where it decomposes to $KNO_3$ on addition of water (cycle shown in FIG. 1 in full lines).

It is of advantage to subject the mother liquor II remaining after separation of the double salt $$KNO_3 \cdot CaCl_2 \cdot 2H_2O$$

to further cooling, preferably to a temperature of −5 to −15° C. so as to crystallize out the calcium chloride as $CaCl_2 \cdot 6H_2O$ and to recycle the mother liquor III, which remains after separation from the $CaCl_2 \cdot 6H_2O$, with the amounts of $K^+$ and $NO_3^-$ contained therein into the process.

Said mother liquor III may be added either to the starting solution (as shown by the broken line in FIG. 1) or to the mother liquor I before or after its concentration, the latter case being illustrated by the dash and dot line of FIG. 1.

The following examples are given to illustrate various embodiments of the invention.

Example 1

This example illustrates the embodiment indicated in FIG. 1 in full lines.

82 kg. of $Ca(NO_3)_2$ and 75 kg. of $KCl$ are introduced in 320 kg. of water. 126 kg. of the double salt $$KNO_3 \cdot CaCl_2 \cdot 2H_2O$$

are added to the solution, and the solution is cooled to −10° C. $KNO_3$ crystallizes out and is obtained by centrifuging in an amount of 93 kg. The remaining mother liquor I, the weight of which is 510 kg., is evaporated to 240 kg., and the concentrate is cooled to +25° C. Thereby, 126 kg. of the double salt $KNO_3 \cdot CaCl_2 \cdot 2H_2O$ crystallize out; they are separated from the mother liquor by centrifuging and returned to the process. The remaining mother liquor II, which is discarded, still contains, in addition to $CaCl_2$, 8 kg. of $KNO_3$. The yield of crystallized $KNO_3$ is 92%.

Example 2

This example illustrates the embodiment of the invention indicated in FIG. 1 by broken lines.

123 kg. of mother liquor III, containing 30 kg. of $CaCl_2$, 31 kg. of $Ca(NO_3)_2$, and 8 kg. of $KNO_3$ are diluted with 360 kg. of water. The double salt $KNO_3 \cdot CaCl_2 \cdot 2H_2O$ (175 kg.) obtained in the cycle process, as well as 82 kg. of $Ca(NO_3)_2$ and 75 kg. of $KCl$ are added. The solution is cooled to −10° C. By centrifuging, 101 kg. of $KNO_3$ are recovered. The mother liquor I (712 kg.) is boiled down to 408 kg.; then it is cooled to 25° C. whereby the double salt $KNO_3 \cdot CaCl_2 \cdot 2H_2O$ crystallizes out (175 kg.). The thus obtained mother liquor II is cooled to about −10° C. whereby calcium chloride crystallizes out. Centrifuging results in 110 kg. of CaCl$_2$.6H$_2$O and 123 kg. of mother liquor III, which is recycled into the process. This process allows of attaining a yield of almost 100%.

In FIG. 2, the various steps of the process corresponding to this example are plotted on the solubility diagram of the reciprocal salt pair. M is the point defining the stoichiometric mixture 2KCl+1Ca(NO$_3$)$_2$, D defines the double salt KNO$_3$.CaCl$_2$.2H$_2$O. The mixture of the double salt with the mother liquor III corresponds to the point A. By addition of the raw materials 2KCl and 1Ca(NO$_3$)$_2$ (point M) results the starting solution B. Said solution precipitates KNO$_3$ on cooling. In the course of the KNO$_3$ crystallization, the point defining the solution shifts along line K–B. At I, the saturation in KNO$_3$ is reached at −10° C. The mother liquor I concentrated by evaporation furnishes, by crystallization of the double salt

KNO$_3$.CaCl$_2$.2H$_2$O at 25° C., the mother liquor II. Cooled to −10° C., said mother liquor II separates CaCl$_2$.6H$_2$O, and there is obtained mother liquor III which, as stated above, is recycled into the process for preparing the starting solution.

*Example 3*

75 kg. of KCl, 82 kg. of Ca(NO$_3$)$_2$, and 166 kg. of the double salt KNO$_3$.CaCl$_2$.2H$_2$O are dissolved in 354 kg. of water, and the solution is cooled to −10° C., thereby crystallizing out KNO$_3$. Centrifuging produces 101 kg. of KNO$_3$ and 576 kg. of mother liquor I. The latter is concentrated by evaporating 300 kg. of water. To said concentrate, there are added 123 kg. of mother liquor III. The solution is cooled to room temperature whereby 166 kg. of the double salt KNO$_3$.CaCl$_2$.2H$_2$O crystallize out. The mother liquor II (233 kg.) obtained by centrifuging is cooled to −10° C., thereby separating calcium chloride in crystallized form. Centrifuging results in 110 kg. of CaCl$_2$.6H$_2$O and 123 kg. of mother liquor III which are recycled into the process.

This modification is represented in FIG. 1 by the dash-dotted line, and the successive steps are shown in the solubility square of FIG. 3. The mixture of the raw materials, 2KCl+Ca(NO$_3$)$_2$, corresponds to point M. The addition of the double salt KNO$_3$.CaCl$_2$.2H$_2$O (point D) furnishes the starting solution B. The cooling produces the precipitation of KNO$_3$ in a mother liquor, represented by point I. The concentrate, represented by the same point, is mixed with mother liquor III, producing mixture C. By precipitation of KNO$_3$.CaCl$_2$.2H$_2$O, mother liquor II is formed which, on further cooling, crystallizes

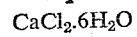
CaCl$_2$.6H$_2$O and passes into mother liquor III. The latter is added to the concentrate I and recycled.

Though we have disclosed the optimum conditions known to us for the various embodiments of our invention, it will be understood that various details may be modified without departing from the spirit of the invention. For instance, the cooling temperature of the starting solution may be somewhat higher or lower within the general range of 0° C. to −30° C. and the cooling temperature of the mother liquor II will depend on the degree of concentration of the mother liquor I. Said latter should be concentrated. The higher the concentration, the less cooling is required; the mother liquor I should be cooled to a temperature in the range of 10° C. to 35° C. to precipitate the double salt, and the mother liquor II to a temperature within the range of 0° C. to −20° C. in order to precipitate CaCl$_2$.6H$_2$O.

What is claimed by Letters Patent is:

1. A process for preparation of potassium nitrate from calcium nitrate and potassium chloride comprising preparing a solution of calcium nitrate and potassium chloride, cooling said solution in a first step to a temperature of −10° to −20° C. to precipitate potassium nitrate, separating the precipitated potassium nitrate from the mother liquor (I), concentrating said mother liquor (I) to 40 to 65 percent of its original weight; cooling said concentrated mother liquor (I) to 20 to 25° C. to precipitate the double salt KNO$_3$.CaCl$_2$.2H$_2$O, separating said precipitate from the mother liquor (II), recycling said precipitate into the first step, cooling said mother liquor (II) to a temperature of −5 to −15° C., thereby crystallizing out calcium chloride, removing said crystallized calcium chloride, and recycling the remaining mother liquor (III) into the process.

2. The process as claimed in claim 1 wherein said mother liquor (III) is admixed to said solution of calcium nitrate and potassium chloride.

3. The process as claimed in claim 1 wherein said mother liquor (III) is admixed to said mother liquor (I).

References Cited

UNITED STATES PATENTS 1,978,751 10/1934 Kubelka et al. _____ 23—102

FOREIGN PATENTS 390,395 2/1924 Germany.

OSCAR R. VERTIZ, *Primary Examiner.*

H. T. CARTER, *Assistant Examiner.*